United States Patent [19]

Kronenberg

[11] 4,163,829

[45] * Aug. 7, 1979

[54] METALLIC REDUCING ADDITIVES FOR SOLID CATHODES FOR USE IN NONAQUEOUS CELLS

[75] Inventor: Marvin L. Kronenberg, Cleveland, Ohio

[73] Assignee: Union Carbide Corporation, New York, N.Y.

[*] Notice: The portion of the term of this patent subsequent to Sep. 13, 1994, has been disclaimed.

[21] Appl. No.: 851,192

[22] Filed: Nov. 14, 1977

[51] Int. Cl.$^2$ .............................................. H01M 6/14
[52] U.S. Cl. .................................................... 429/194
[58] Field of Search ............... 429/194, 196, 197, 199, 429/219, 220, 221, 223, 224, 228, 218

[56] References Cited

U.S. PATENT DOCUMENTS

| | | | |
|---|---|---|---|
| 3,716,410 | 2/1973 | Butler et al. | 429/194 X |
| 3,920,478 | 11/1975 | Kozawa | 429/206 |
| 3,925,102 | 12/1975 | Kozawa | 429/206 |
| 4,018,970 | 4/1977 | Jumel et al. | 429/194 X |
| 4,048,403 | 9/1977 | Kronenberg | 429/194 |

FOREIGN PATENT DOCUMENTS

| | | | |
|---|---|---|---|
| 52-45029 | 6/1975 | Japan | 429/206 |
| 52-31326 | 3/1977 | Japan | 429/194 |

Primary Examiner—Charles F. Lefevour
Attorney, Agent, or Firm—Cornelius F. O'Brien

[57] ABSTRACT

The invention relates to nonaqueous cells employing an anode, a cathode and an electrolyte wherein the cathode comprises an active cathode material, carbon and/or graphite, and an amount of a metallic reducing agent to reduce any materials in the cell which are more cathodic (positive) than the active cathode material with respect to the cell's working anode.

15 Claims, 3 Drawing Figures

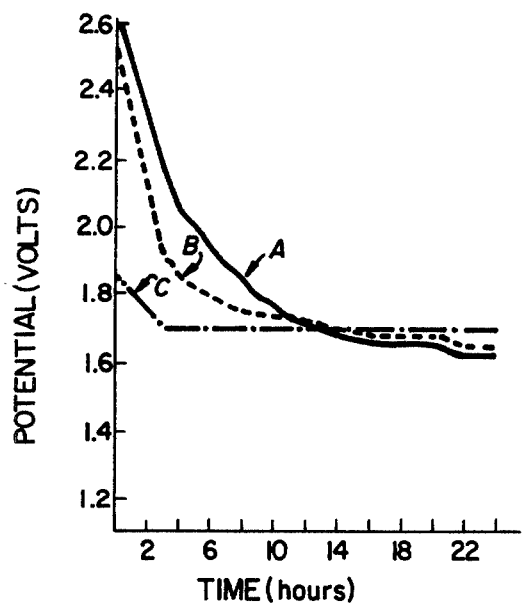
FIG. 1
FIG. 2
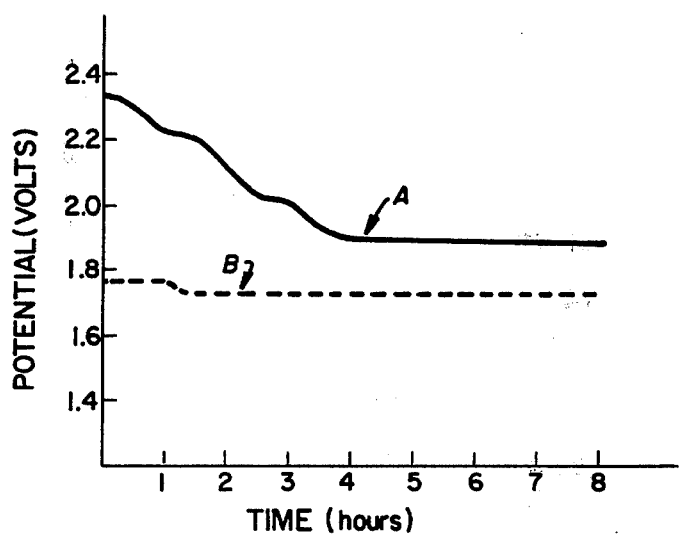
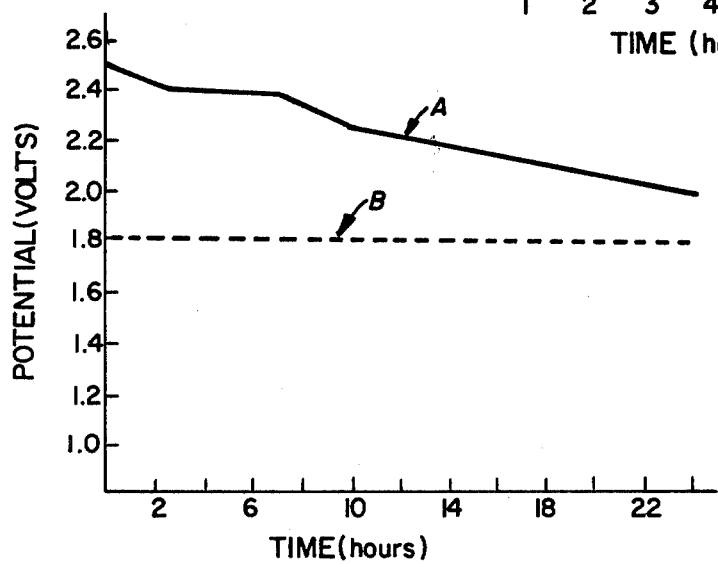
FIG. 3

METALLIC REDUCING ADDITIVES FOR SOLID CATHODES FOR USE IN NONAQUEOUS CELLS

FIELD OF THE INVENTION

The invention relates to nonaqueous cells employing a cathode comprising a major amount of an active cathode material, a minor amount of graphite and/or carbon, and a minor amount of a metallic reducing agent, such as zinc, said metallic reducing agent being sufficient to reduce any materials present in the cell which are more cathodic (positive) than the active cathode material with respect to the cell's working anode.

BACKGROUND OF THE INVENTION

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$ and the like. The use of aqueous electrolytes is precluded in these systems since the anode materials are sufficiently active to react with water chemically. Therefore, in order to realize the high energy density obtainable through use of these highly reactive anodes and high energy density cathodes, it is necessary to use a nonaqueous electrolyte system.

Many cell or battery applications, particularly in transistorized devices, such as hearing aids, watches, calculators, and the like, require a substantially unipotential discharge source for proper operation. However, it has been found that in many nonaqueous cells employing positive active materials which include a conductive additive such as graphite and/or carbon, the cell upon initially being discharged, exhibits a high voltage whereupon the cell then proceeds to reach its lower operative discharge voltage level only after a certain time period has elapsed. The time period for the cell to reach its intended operating discharge voltage level usually depends on the discharge rate through the load and thus, depending on the apparatus it is to power, could result in a period extending up to several hours or even days. This phenomenon has serious drawbacks when a cell is intended to be used in electronic devices requiring a substantially unipotential discharge source for proper operation. In some of these electronic devices, any initial voltage peak substantially exceeding the intended operating voltage for the device could result in serious damage to the electronic components of the device. One approach to protect devices from batteries exhibiting high voltages prior to leveling off to their desired operating voltage level is to add additional electronic circuit components to protect the main operating components of the device. However, this not only adds to the expense of the device but also would result in enlarging the device to accommodate the protective circuitry. With the emphasis placed on miniaturization, it has become necessary for the battery industry to design smaller and smaller miniature power cells.

To compensate or to eliminate this initial high voltage during discharge of nonaqueous cells, it has been suggested in U.S. Pat. No. 4,018,970 that graphite and/or carbon which is normally employed as a conducting material in the cathodes of these cells be eliminated and replaced with another electronic conductor. It also discloses that when the electronic conductor has, in relation to the postulated decomposition of the electrolyte, an overvoltage such that the decomposition takes place only at a potential lower than the positive active material reduction potential, then the electrolyte decomposition does not take place before the discharge of the positive active material, since the latter reduction maintains the electrode at a potential which is too high for the decomposition to take place. Thus, the teachings in this reference basically require that the normal conductive materials of graphite and/or carbon, which are normally employed in cathodes, be eliminated.

Accordingly, it is the primary object of this invention to provide a nonaqueous cell having a cathode comprising an active cathode material, a conductive material of graphite and/or carbon, and a minor amount of a metallic reducing agent which will effectively eliminate the initial high voltage usually exhibited during the initial discharge of the cell.

Another object of the present invention is to provide a nonaqueous cell which employs a cathode having a graphite and/or carbon additive to improve the conductivity of the cathode and which exhibits a substantially unipotential voltage output during discharge.

Another object of the present invention is to provide a nonaqueous cell employing a cathode comprising an active cathode material, graphite and/or carbon, and a metallic reducing agent either within the cathode or in electrical and ionic contact with the cathode such that during initial discharge of the cell, a substantially unipotential discharge voltage will be exhibited.

Another object of the present invention is to provide a nonaqueous lithium cell employing an $FeS_2$ cathode containing a minor amount of graphite and/or carbon along with a metallic reducing agent and which cell will exhibit a substantially unipotential discharge voltage.

SUMMARY OF THE INVENTION

The invention basically relates to a nonaqueous cell having an anode, an electrolyte and a solid cathode, said solid cathode comprising a major amount of solid active cathode material, a minor amount of graphite and/or carbon, and a minor amount of a metallic reducing agent, said metallic reducing agent being sufficient to reduce any materials in the cell which are more cathodic (positive) than the active cathode material with respect to the anode.

The amount of the metallic reducing agent to be added to the cathode should be sufficient to fully reduce materials in the cell that are more cathodic than the working active cathode materials with respect to the working anode. Generally between about 1 to about 20 weight per cent, preferably about 2 to 4 weight per cent, based on the weight of the cathode mix (active cathode material, conductive agent and binder, if any) would be suitable for most applications. Based on the amount of graphite and/or carbon in the cathode, the metallic reducing agent could be added in an amount of between about 10 and about 100 per cent preferably about 20 per cent of the weight of the graphite and/or carbon.

Although not wanting to be bound by theory, it is believed that when employing battery grade carbon and/or graphite as an additive to solid cathodes for use in nonaqueous systems, the carbon and/or graphite appears to have a small quantity of sorbed oxygen or oxygen-containing compounds on its surface, which supports a high open circuit voltage reading versus the anode of the cell. These oxygen-containing surface materials also appear to show come coulombic capacities, so that the initial discharge voltage of the cell may be above the normal operating plateau until the oxygen-containing material is reduced. It has been found that the undesirable high voltage level exhibited during the initial discharge of nonaqueous cells employing solid cathodes can be eliminated by the addition of a metallic reducing agent to react with the oxygen species on the carbon and/or graphite. The metallic reducing agent should be added in an amount sufficient to fully reduce the oxygen species without reacting excessively with the active cathode material. Preferably this can be accomplished if the potential of the metallic reducing agent is within about 0.3 volt of the potential attained by the active cathode material or is more positive than the active cathode material and less positive than the oxygen species on the graphite and/or carbon material with respect to the cell's anode. For example, in a nonaqueous lithium/$FeS_2$ system, the potential at low drain rates is about 1.8 volts and the potential of the lithium/oxygen species is about 3.0 volts. Thus, a reducing agent could be added to the $FeS_2$ cathode mix containing the oxygen species that would reduce the oxygen species while very little if any of the $FeS_2$ is reduced, provided the potential of the reducing agent with respect to lithium was more positive than 1.5 volts and less positive than 3.0 volts. In addition, metallic reducing agents which have potentials below that of the active cathode materials with respect to the cell working anode, i.e., which are anodic with respect to the active cathode material, could be employed in accordance with this invention, provided that they are not added in an amount sufficient to reduce more than about 10 per cent, preferably not more than 5 per cent, of the active cathode material.

Consequently, in accordance with this invention, it is possible to maintain the use of graphite and/or carbon as an electronic conductor in the preparation of solid cathode mixes while, at the same time, eliminating the high voltage level usually exhibited during the initial discharge of nonaqueous cells employing such electronic conductors. Thus, in accordance with this invention, a reducing agent or a sacrificial anode is included in the cathode of the cell for the purpose of fully reducing only the undesirable cathodic materials that may be present in the cell and thus effectively provide a cell which will discharge within a narrow voltage output range.

The metallic reducing agent can either be employed in a mixture in the forming of a cathode or it could be placed in contact with the cathode. Thus, any discrete material such as a layer, a coating, a metallic screen, a metallic strip, a porous metallic strip, or a powder could be employed as long as it is in electrical and ionic contact with the cathode. The choice of a metallic reducing agent will depend upon the voltage of the cell's active cathode material with reference to the anode of the cell. For example, while zinc may be satisfactory for a nonaqueous lithium/$FeS_2$ system, it may not be suitable for a nonaqueous lithium/$Ag_2O$ system since, in the latter, a less anodic (negative) metallic reducing agent may be required, such as tin or lead. Thus, once an EMF series is determined for a specific nonaqueous electrolyte and anode/cathode system, it will be easy to accurately select which metallic reducing agents can be used in accordance with this invention.

BRIEF DESCRIPTION OF THE DRAWINGS

FIGS. 1-3 are voltage versus time plots for miniature button cells employing various cathode compositions as described hereinafter in Examples III–V respectively.

Table 1 is a rough guide for selection of the metal additives to be used as metallic reducing agents for different active cathode materials intended for employment in a lithium nonaqueous system. These are only estimates, and results will vary somewhat, depending on the electrolyte system selected.

TABLE 1

| Active Cathode Materials | *Approximate Operating Potential (V) | Common Metals in Proper Potential Range |
|---|---|---|
| $FeS_2$, CdO | 1.8 | V, Mn, Zn, Cr, Fe, Cd, In, Sn, Pb |
| $Bi_2O_3$ | 1.7 | " |
| CuO, CoS, $Pb_3O_4$ | 1.6 | " |
| $In_2S_3$, PbS | 1.4 | Zr, V, Mn, Zn, Cr, Fe, Cd, In, Sn, Pb |
| $Co_3O_4$ | 1.3 | Ti, Zr, V, Mn, Zn, Cr, Fe, Cd, In, Sn, Pb |
| $Ag_2O$ | 2.2 | Cr, Fe, Cd, In, Sn, Pb |

*With respect to lithium.

The metallic reducing agent for use in this invention can be selected from the group consisting of zinc, vanadium, manganese, chromium, iron, cadmium, indium, tin, lead zirconium and titanium. In addition, if the amount of reducing agent employed is carefully limited, more active metallic reducing agents such a lithium, sodium, potassium, magnesium, aluminum, or calcium may be used.

In the nonaqueous cell systems of this invention, suitable active cathode materials would include $CF_x$, metal oxides, such as $V_2O_5$, $WO_3$, $MoO_3$, lead oxides (e.g., $Pb_3O_4$ and PbO), cobalt oxides, $MnO_2$, copper oxides (e.g., CuO), etc., metal sulfides, such as CuS, $CoS_2$, $In_2S_3$, iron sulfides (e.g., FeS, $FeS_2$), NiS, metal chromates, such as $Ag_2CrO_4$, metal phosphates, such as $Ag_3PO_4$, and metal sulfates, such as $CuSO_4$.

Highly active anodes for use in nonaqueous systems according to this invention would be consumable metals and include aluminum, the alkali metals, alkaline earth metals and alloys of alkali metals or alkaline earth metals with each other and other metals.

The term "alloys" as used herein and in the appended claims is intended to include mixtures, solid solutions, such as lithium-magnesium, and the intermetallic compounds, such as lithium monoaluminide. The preferred anode materials are lithium, sodium, potassium, calcium, magnesium and alloys thereof. Of the preferred anode materials, lithium would be the best because, in addition to being a ductile metal that can be easily assembled in a cell, it possesses the highest energy-to-weight ratio of the group of suitable anodes.

In nonaqueous cells, useful organic solvents employed alone or mixed with one or more other solvents for use in preparing electrolytes employed in the cell of this invention include the following classes of compounds:

---

Alkylene nitriles: e.g., crotonitrile
  (liquid range −51.1° C. to 120° C.)
Trialkyl borates: e.g., trimethyl borate, $(CH_3O)_3B$ -continued (liquid range −29.3° C. to 67° C.)
Tetraalkyl silicates: e.g., tetramethyl silicate, $(CH_3O)_4Si$
(boilint point 121° C.)
Nitroalkanes: e.g., nitromethane, $CH_3NO_2$
(liquid range −17° C. to 100.8° C.)
Alkylnitriles: e.g., acetonitrile, $CH_3CN$
(liquid range −45° C. to 81.6° C.)
Dialkylamides: e.g., dimethylformamide, $HCON(CH_3)_2$
(liquid range −60.48° C. to 149° C.)

Lactams: e.g., N-methylpyrrolidone, $\overline{CH_2-CH_2-CH_2-CO-N}-CH_3$
(liquid range −16° C. to 202° C.)
Monocarboxylic acid esters: e.g., ethyl acetate
(liquid range −83.6° to 77.06° C.)
Orthoesters: e.g., trimethylorthoformate, $HC(OCH_3)_3$
(boiling point 103° C.)

Lactones: e.g., δ-(gamma) butyrolactone, $\overline{CH_2-CG_2-CH_2-O-CO}$
(liquid range −42° to 206° C.)
Dialkyl carbonartes: e.g., dimethyl carbonate,
$OC(OCH_3)_2$ (liquid range 2° to 90° C.)
Alkylene carbonates: e.g., propylene carbonate,
$CH(CH_2)CH_2-O-CO-O$ (liquid range −48° to 242° C.)
Monoethers: e.g., diethyl ether (liquid range −116°
to 34.5° C.)
Polyethers: e.g., 1,1- and 1,2-dimethoxyethane
(liquid ranges −113.2° to 64.5° C. and −58° to
83° C., respectively)
Cyclic ethers: e.g., tetrahydrofuran (liquid range
−65° to 67° C.); 1,3-dioxolane (liquid range
−95° to 78° C.)
Nitroaromatics: e.g., nitrobenzene (liquid range
5.7° to 210.8° C.)
Aromatic carboxylic acid halides: e.g., benzoyl
chloride (liquid range 0° to 197° C.); benzoyl
bromide (liquid range −24° to 218° C.)
Aromatic sulfonic acid halides: e.g., benzene sulfonyl
chloride (liquid range 14.5° to 251° C.)
Aromatic phosphonic acid dihalides: e.g., benzene
phosphonyl dichloride (boiling point 258° C.)
Aromatic thiphosphonic acid dihalides: e.g.,
benzene thiophosphonyl dichloride (boiling
point 124° C. at 5 mm.)
Cyclic sulfones: e.g., sulfolane, $\overline{CH_2-CH_2-CH_2-CH_2-SO_2}$ (melting point 22° C.);
3-methylsulfolane (melting pint −1° C.)
Alkyl sulfonic acid halides: e.g., methanesulfonyl
chloride (boiling point 161° C.)
Alkyl carboxylic acid halides: e.g., acetyl chloride
(liquid range −112° to 50.9° C.); acetyl bromide
(liquid range −96° to 76.0° C.); propionyl
chloride (liquid range −94° to 80° C.)
Saturated heterocyclics: e.g., tetrahydrothiophene
(liquid range −96° to 121° C.); 3-methyl-2-oxa-
zolidone (melting point 15.9° C.)
Dialkyl sulfamic acid halides: e.g., dimethyl.
sulfamyl chloride (boiling point 80° C. at 16 mm.)
Alkyl halosulfonates: e.g., ethyl chlorosulfonate
(boiling bpoint 151° C.)
Unsaturated heterocyclic carboxylic acid halides:
e.g., 2-furoyl chloride (liquid range −2° to 173° C.)
Five-membered unsaturated heterocyclics: e.g.,
3,5-dimethylisoxazole (boiling point 140° C.)
1-methylpyrrole (boiling point 114° C.);
2,4-dimethylthiazole (boiling point 144° C.);
furan (liquid range −85.65° to 31.36° C.)
Esters and/or halides of dibasic carboxylic acids: e.g., ethyl oxalyl
chloride (boiling point 135° C.)
Mixed alkyl sulfonic acid halides and carboxlic acid halides, e.g.,
chlorosulfonyl acetyl chloride (boiling point 98° C. at 10 mm)
Dialkyl sulfoxides: e.g., dimethyl sulfoxide
(liquid range +18.4° to 189° C.)
Dialkyl sulfates: e.g., dimethylsulfate
(liquid range −31.75° to 188.5° C.)
Dialkyl sulfites: e.g., dimethylsulfite (boiling point 126° C.)
Alkylene sulfites: e.g., ethylene glycol sulfite
(liquid range −11° to 173° C.)
Halogenated alkanes: e.g., methylene chloride (liquid range −95°

-continued to 40° C.); 1,3-dichloropropane (liquid range −99.5° to 120° C.)

Of the above, the preferred solvents are sulfolane; crotonitrile; nitrobenzene; tetrahydrofuran; 1,3-dioxolane; 3-methyl-2-oxazolidone; propylene or ethylene carbonate; γ-butyrolactone; ethylene glycol sulfite; dimethylsulfite; dimethyl sulfoxide; and 1,1- and 1,2-dimethoxyethane. Of the preferred solvents, the best are 3-methyl-2-oxazolidone, propylene or ethylene carbonate, 1,2-dimethoxyethane, and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., $LiCF_3SO_3$ or $LiClO_4$, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

A separator for use in this invention has to be chemically inert and insoluble in the cell system and have a porosity so as to permit the liquid electrolyte to permeate through and contact the anode of the cell, thus establishing an ion transfer path between the anode and cathode.

The container housing for the cell can be made of stainless steel, iron, nickel, nickel-plated steel or some other conductive material that will not corrode or otherwise deteriorate when in contact with the cell materials.

The insulating member disposed between the cover and the can has to be stable in the presence of the cell components and can be selected from such materials as polytetrafluoroethylene (e.g., "Teflon"), fluorinated ethylene-propylene (e.g., FEP) ethylene copolymer with FEP (e.g., "Tefzel"), chlorotrifluoroethylene (e.g., "Kel-F"), perfluoro-alkoxy polymer (e.g, PFA), tetrafluoroethylene (TFE), polyvinyl, polyethylene, polypropylene, polystyrene, nylon, etc.

FIGS. 1 through 3 are graphs illustrating the comparison of the discharge characteristics of different type prior art button cells and different button cells made in accordance with this invention.

EXAMPLE I

A flat type cell was constructed utilizing a metal base having a shallow depression in which the cell contents were placed. A metal cap was then disposed on top and the cell was sealed. The contents of the cell consisted of a 5 square centimeter lithium anode disc, a cathode comprising 3 grams of $FeS_2$, a 1 M $LiCF_3SO_3$ in 40 per cent dioxolane, 30 per cent dimethoxyethane and 30 per cent 3-methyl-2-oxazolidone containing a trace of dimethylisoxazole, a cathode collector made of nickel screen and a nonwoven polypropylene separator. On a 1.2 mA drain, the cell exhibited a voltage of 1.8 volts and within about 15 minutes exhibited a unipotential output voltage of approximately 1.4 volts and continued to discharge at this level. However, although this type of cell will perform satisfactorily at low drain rates, it is seriously deficient under heavy drain or high current pulsing conditions due to the high internal resistance.

A similar cell was constructed except that the cathode was prepared using 2.25 grams of $FeS_2$ along with 0.25 gram of carbon black added to increase the conductivity of the cathode. This cell was discharged in the same manner, and on a 1.2 mA drain it exhibited 2.8 volts and took about 4 hours before it leveled off to an output voltage of approximately 1.2 volts for the remainder of the discharge. Thus it is apparent that with the addition of carbon in the cathode of the cell, a high voltage is exhibited during initial discharge which, as stated above, could be detrimental to certain electronic components employing the cell as a power source.

Another flat type cell was produced using the same components except that 0.5 gram of metallic zinc powder (about 20 weight per cent of the cathode mix) was added to the $FeS_2$-carbon black mixture as described above. The cell was discharged and on a 1.2 mA drain exhibited 2.2 volts whereupon it decreased to a substantially unipotential voltage of about 1.5 volts within approximately an hour and a half and continued at the unipotential level for the remaining of the discharge. Thus this test illustrated that the addition of the zinc powder as a metallic reducing agent to the cell, along with the presence of the carbon conductive material, produced an overall cell whose output would be characterized as being substantially unipotential during the discharge.

Two additional flat cells were made as above except that in one cell iron was employed as the metallic reducing agent and in the other cell tin was employed as the metallic reducing agent. On a 1.2 mA drain, the cell with the tin exhibited 2.2 volts and then decreased to about 1.45 volts after approximately 2 hours and continued to discharge at this level. The cell with the iron exhibited 2.6 volts and took about 4 hours before reaching the 1.5 voltage level at which it continued to discharge. Thus of the three metallic reducing agents added, zinc proved to be the best, followed by tin with the worst being iron.

EXAMPLE II

Example I was repeated except that the active cathode material CuO was used instead of $FeS_2$; only the zinc additive was employed. The cells were again discharged on a 1.2 mA drain and the cell employing the zinc metallic reducing agent in combination with the carbon conductive material has a noticeably lower initial voltage than the cell which employed the carbon conductive material without the metallic reducing agent. Again, this Example further illustrates that by the incorporation of a metallic agent in contact with the cathode of the cell, the unusually high voltage during initial discharge can be substantially eliminated.

EXAMPLE III

Three miniature size button cells were constructed using the $Li/FeS_2$ system. The cells were 0.45 inch (1.13 cm) in diameter by 0.160 inch (0.40 cm) high. The cell consisted of a lithium disc, an $FeS_2$ cathode having the composition shown in Table 2, a polypropylene separator, and an electrolyte as employed in Example I. Three of each type of cell using cathodes as shown in Table 2 were discharged across a 150 Kohm load at 95° F. The average potential output for each group of three cells employing the cathode compositions in Table 2 is plotted on the graph in FIG. 1 wherein curve A represents the cell employing cathode A, curve B represents the cell employing cathode B and, in a like manner, curve C represents the cell employing cathode C. As is evident from a comparison of the three curves, the addition of the metallic reducing agent effectively eliminated the high initial voltage that was exhibited with the cells employing carbon or graphite alone without the metallic reducing agent.

TABLE 2

| (Weight %) | CATHODE COMPOSITION | | |
|---|---|---|---|
| | Cathode A | Cathode B | Cathode C |
| $FeS_2$ | 84.36 | 85.00 | 85.00 |
| Graphite | — | 7.99 | 5.99 |
| Carbon | 8.58 | — | — |
| Zinc Powder | — | — | 2.00 |
| Binder ("Teflon"* as Emulsion) | 7.06 | 7.01 | 7.01 |
| | 100.00 | 100.00 | 100.00 |

*Trade mark for polytetrafluoroethylene.

EXAMPLE IV

Three lithium miniature button cells as disclosed in Example III were produced using cathode A shown in Table 3 and two miniature button cells were produced using cathode B. The other components of the cells were the same as disclosed in Example III. In the two cells employing cathode B, an expanded zinc screen was disposed at the interface of the bottom of the cathode can and the cathode. The cells were discharged across a 150 Kohm load at 95° F. The average potential output versus that for the group of three cells employing cathode A is shown plotted on the graph in FIG. 2 as curve A, while the average potential output versus time for the two cells employing cathode B is shown plotted on the graph as curve B. As is evident from a comparison of the two curves, the addition of the zinc screen as the metallic reducing agent effectively eliminated the initial high voltage that was exhibited with cells employing carbon and graphite alone without the metallic reducing agent.

TABLE 3

| (Weight %) | CATHODE COMPOSITION | |
|---|---|---|
| | Cathode A | Cathode B |
| $FeS_2$ | 82.0 | 82.0 |
| Carbon | 5.0 | 5.0 |
| Graphite | 6.5 | 6.5 |
| Steel Wool | 0.5 | 0.5 |
| Zinc Screen | — | Yes* |
| Binder ("Teflon"** Emulsion) | 6.0 | 6.0 |
| | 100.0 | 100.0 |

*Zinc screen weighed about 10% of the cathode mix weight.
**Trade mark for polytetrafluoroethylene.

EXAMPLE V

Using cathodes A and B as shown in Table 4, three cells of each type were produced using the components as described in Example IV. The cells were discharged across a 150 Kohm load at 95° F. The average potential output versus time for the group of three cells employing cathode A is shown plotted on the graph in FIG. 3 as curve A, while the average potential output versus time for the three cells employing cathode B is shown plotted on the graph as curve B. As is evident from a comparison of the two curves, the addition of the zinc screen as the metallic reducing agent effectively eliminated the initial high voltage that was exhibited by the cells employing carbon alone without the metallic reducing agent.

TABLE 4

| (Weight %) | CATHODE COMPOSITION | |
|---|---|---|
| | Cathode A | Cathode B |
| CuO | 91.03 | 82.0 |
| Carbon | 4.92 | 10.0 |
| Zinc Screen | — | Yes* |
| Binder ("Teflon"** Emulsion) | 4.05 | 8.0 |
| | 100.00 | 100.0 |

*Zinc screen weighed about 10% of the cathode mix weight.
**Trade mark for polytetrafluoroethylene.

As stated above, the metallic reducing agents of this invention could be incorporated into the cathodes or they could be employed as a layer or coating or otherwise discrete material as long as they are in contact both electronically and ionically with the cathodes. All that is necessary is that the metallic reducing agent be present in the cell, specifically in the cathode, which is more cathodic than the cell's working cathode material with respect to the cell's working anode.

What is claimed is:

1. A nonaqueous cell having an anode, an electrolyte comprising an organic solvent and a solute, and a solid cathode, said solid cathode comprising a major amount of solid active material, a minor amount of graphite and/or carbon, and a minor amount of a metallic reducing agent, said metallic reducing agent being sufficient to reduce any materials in the cell which are more cathodic than the active cathode material with respect to the anode.

2. The nonaqueous cell of claim 1 wherein the metallic reducing agent is incorporated throughout the cathode.

3. The nonaqueous cell of claim 1 wherein the metallic reducing agent is a discrete material in electrical and ionic contact with the cathode.

4. The nonaqueous cell of claim 1 wherein the metallic reducing agent is selected from the group consisting of zinc, vanadium, manganese, chromium, iron, cadmium, indium, tin, lead, zirconium, titanium, lithium, sodium, potassium, magnesium, aluminum and calcium.

5. The nonaqueous cell of claim 4 wherein the metallic agent is zinc.

6. The nonaqueous cell of claim 1 wherein the active cathode material is selected from the group consisting of $CF_x$, $V_2O_5$, $WO_3$, $MoO_3$, lead oxides, cobalt oxides, $MnO_2$, copper oxides, CuS, $CoS_2$, $In_2S_3$, iron sulfides, NiS, $Ag_2CrO_4$, $Ag_3PO_4$ and $CuSO_4$ and wherein the anode is selected from the group consisting of lithium, sodium, potassium, calcium, magnesium and alloys thereof.

7. The nonaqueous cell of claim 6 wherein the active cathode material is $FeS_2$ and the anode is lithium.

8. The nonaqueous cell of claim 6 wherein the active cathode material is copper oxide and the anode is lithium.

9. The nonaqueous cell of claim 6 wherein the active cathode material is lead oxide and the anode is lithium.

10. The nonaqueous cell of claim 6 wherein the active cathode material is copper sulfide and the anode is lithium.

11. The nonaqueous cell of claim 6 wherein the active cathode material is $MnO_2$ and the anode is lithium.

12. The nonaqueous cell of claim 6 wherein the metallic reducing agent is zinc powder.

13. The nonaqueous cell of claim 6 wherein the metallic reducing agent is a zinc strip.

14. The nonaqueous cell of claim 13 wherein the zinc strip is perforated.

15. The nonaqueous cell of claim 6 wherein the metallic reducing agent is a zinc screen.

* * * * *

UNITED STATES PATENT AND TRADEMARK OFFICE
CERTIFICATE OF CORRECTION

PATENT NO. : 4,163,829
DATED : August 7, 1979
INVENTOR(S) : Marvin Lee Kronenberg It is certified that error appears in the above-identified patent and that said Letters Patent are hereby corrected as shown below:

Column 4, line 32, the word "a" should read -- as --.

Column 5, line 21, "$CH(CH_2)CH_2-O-CO-O$" should read -- $\overline{CH(CH_3)CH_2-O-CO-O}$ --.

Column 5, line 36, the word "respectivey" should read -- respectively --.

Column 7, line 1, "120°C." should read -- 120.4°C. --.

Signed and Sealed this

Twenty-second Day of January 1980

[SEAL]

Attest:

SIDNEY A. DIAMOND

Attesting Officer

Commissioner of Patents and Trademarks